(12) United States Patent
Ni

(10) Patent No.: US 7,883,560 B2
(45) Date of Patent: Feb. 8, 2011

(54) DUST SEPARATING APPARATUS OF A VACUUM CLEANER

(75) Inventor: Zugen Ni, Suzhou Jiangsu (CN)

(73) Assignee: Kingclean Electric Co., Ltd., Suzhou, Jiangsu (CN)

( * ) Notice: Subject to any disclaimer, the term of this patent is extended or adjusted under 35 U.S.C. 154(b) by 0 days.

(21) Appl. No.: 12/594,145

(22) PCT Filed: Mar. 14, 2008

(86) PCT No.: PCT/CN2008/000512

§ 371 (c)(1),
(2), (4) Date: Sep. 30, 2009

(87) PCT Pub. No.: WO2008/119237

PCT Pub. Date: Oct. 9, 2008

(65) Prior Publication Data

US 2010/0132316 A1 Jun. 3, 2010

(30) Foreign Application Priority Data

Apr. 3, 2007 (CN) .................... 2007 2 0036304 U

(51) Int. Cl.
*B01D 45/00* (2006.01)

(52) U.S. Cl. .................... 55/343; 55/345; 55/346; 55/424; 55/426; 55/428; 55/429; 55/DIG. 3; 15/352; 15/353

(58) Field of Classification Search ............ 55/343, 55/345, 346, 424, 426, 428, 429; 15/352, 15/353

See application file for complete search history.

(56) References Cited

U.S. PATENT DOCUMENTS

| | | | | |
|---|---|---|---|---|
| 6,428,589 B1 * | 8/2002 | Bair et al. | ........ | 55/318 |
| 6,572,668 B1 * | 6/2003 | An et al. | ........ | 55/428 |
| 6,746,500 B1 * | 6/2004 | Park et al. | ........ | 55/343 |
| 6,755,880 B2 * | 6/2004 | Ni | ........ | 55/426 |
| 7,708,791 B2 * | 5/2010 | Oh et al. | ........ | 55/345 |
| 2003/0200736 A1 * | 10/2003 | Ni | ........ | 55/426 |
| 2005/0229554 A1 * | 10/2005 | Oh et al. | ........ | 55/346 |
| 2006/0117520 A1 * | 6/2006 | Choi | ........ | 15/352 |
| 2006/0156699 A1 * | 7/2006 | Kim | ........ | 55/345 |
| 2006/0218744 A1 * | 10/2006 | Hayashi et al. | ........ | 15/347 |
| 2006/0230720 A1 * | 10/2006 | Han et al. | ........ | 55/345 |
| 2006/0254226 A1 * | 11/2006 | Jeon | ........ | 55/345 |
| 2006/0277712 A1 * | 12/2006 | Kim et al. | ........ | 15/353 |
| 2007/0079583 A1 * | 4/2007 | Oh | ........ | 55/345 |
| 2007/0079587 A1 * | 4/2007 | Kim | ........ | 55/349 |
| 2007/0144116 A1 * | 6/2007 | Hong et al. | ........ | 55/345 |
| 2010/0043170 A1 * | 2/2010 | Ni | ........ | 15/352 |

* cited by examiner

*Primary Examiner*—Jason M Greene
*Assistant Examiner*—Dung Bui
(74) *Attorney, Agent, or Firm*—Greer, Burns & Crain, Ltd.

(57) ABSTRACT

A dust separating apparatus of a vacuum cleaner, includes a housing, a first cyclone separator integrated within the housing, and second cyclone separators arranged around the first cyclone separator, wherein the second cyclone separators are removably mounted into the housing. The first and second cyclone separators respectively have a separate dust receiving cavity and separate dust collecting chambers.

11 Claims, 9 Drawing Sheets

DUST SEPARATING APPARATUS OF A VACUUM CLEANER

FIELD OF INVENTION

The present invention relates to a dust separating apparatus of a vacuum cleaner.

BACKGROUND OF THE INVENTION

Usually a vacuum cleaner is provided with a cleaning device for filtering the dust-laden air sucked in with the dust and particles collected in a dust cup and discharging the filtered air. That is, the cleaning device of the traditional vacuum cleaner is actually a filtering device. Therefore, the users should have the filter devices cleaned or replaced after using for a while. Otherwise, fine dust may clog the filtering apertures of the filtering devices, thereby increasing the resistance of the vacuum motor or even burning it out. That will bring troubles to the users, and will affect the performance and lifetime of the vacuum cleaners.

In recent years, according to the principle of cyclone separation, some vacuum cleaner manufacturers use a cyclone separator to replace the filtering device and achieve favorable results. Therefore, that has been widely used in vacuum cleaners. The cyclone separator is provided in its dust cup with a conical cyclone cylinder, which is provided vertically at the top end with an airflow outlet pipe connected through with the air outlet of dust cup. The cyclone cylinder is also provided at its bottom end with an opening for dust falling into the dust collecting case at the bottom of the dust cup. The airflow inlet pipe is provided on the side wall of the upper portion of the cyclone cylinder and along the tangential direction, so that air flow carrying dust will generate cyclone in the cyclone cylinder. Dust and particles will fall along the side wall of the cyclone cylinder into the bottom of the dust collecting case under centrifugal force, and the filtered air flow is discharged out of the dust cup upwards through the airflow outlet pipe.

However, with the reinforcement of the environment protection consciousness of the customers, vacuum cleaners of single stage can not meet their requirements. Vacuum cleaners which have better filtering performance and cleaner air discharged and have not secondary pollution are required. However, the vacuum cleaners with two stages of separating apparatus may result in defects that the cyclone raises dust and cleaning the dust is inconvenient.

Moreover, the customers of different area in the international market have different requirements. Some customers, e.g. supermarkets, need vacuum cleaners of lower price and middle-level performance, and a single cyclone separation is usually required in the filtering performance of the dust cup of the vacuum cleaner. Some customers, e.g. high-end customers, require vacuum cleaners of high filtering performance. Therefore vacuum cleaners of two cyclone separation stages and the second cyclone separation carried in multiple cyclone cylinders are required. Therefore, different dust cups need developing for the design of the same contour of vacuum cleaners, thereby resulting in increased production cost and waste in design and production resources. In order to solve the above problems, a vacuum cleaner which can meet the forgoing two different requirements and won't affect the contour is required.

SUMMARY OF THE INVENTION

The object of the present invention is to provide a dust separating apparatus of a vacuum cleaner which comprises several removable second cyclone separators mounted around a first cyclone separator. The first and second cyclone separators respectively have a separate dust receiving cavity and separate dust collecting chambers, so that the dust could be thoroughly separated from the air to enable the expelled air cleaner without secondary pollution. Furthermore, the dust could be disposed independently for convenience.

One aspect of the present invention is to provide a dust separating apparatus of a vacuum cleaner, which comprises a housing, a first cyclone separator integrated within the housing, and several second cyclone separators arranged around the first cyclone separator, wherein the second cyclone separators are removably mounted into the housing, and the first cyclone separator and each of the second cyclone separators respectively have a separate dust receiving cavity and a separate dust collecting chamber.

Furthermore, the housing comprises an outer cylinder body and an inner cylinder body, which share a common bottom cover and between which a dust receiving cavity is defined. In the inner cylinder body, a cyclonical chamber is arranged and in the upper portion of the inner cylinder body, a dust outlet is arranged. An airflow inlet pipe enters the inner cylinder body through the outer cylinder body. An annular shelf is arranged in the middle portion of the inner side of the outer cylinder body, and from whose inner edge a middle cylinder body extends upwardly. The second cyclone separators are arranged between the middle cylinder body and the outer cylinder body, and stand on the shelf. An upper lid is arranged at the top end of the middle cylinder body and a filter member fixed on the upper lid is arranged above the inner cylinder body, with an opening at the top end of the filter member being connected through with the second cyclone separators via an air outlet on the upper lid.

Furthermore, an air inlet cavity connected through with the air outlet is arranged above the upper lid, an air outlet cavity with an air discharging outlet thereon is arranged above the air inlet cavity, each second cyclone separator includes an inlet barrel in its upper portion, a tapered barrel in its middle portion and a dust collecting chamber in its lower portion. The inlet barrel extends upwardly into the air inlet cavity, and a cyclone inlet in the air inlet cavity is defined on the side wall of the inlet barrel. An airflow outlet pipe is arranged in the inlet barrel and the top end of airflow outlet pipe is connected through with the air outlet cavity via the air inlet cavity.

Preferably, the second cyclone separators comprise several cyclonic units, and the dust collecting chambers thereof share a common annular cover at their bottom ends.

Furthermore, at several connections of the tapered barrels and the dust collecting chambers umbrella-shaped reflecting plates are arranged, each of which has a ring gap for dust dropping defined along its peripheral and a reflowing hole defined at its center.

Still preferably, a cone-shaped protrusion is arranged on the bottom cover of the inner cylinder body, while an inverted cone protrusion corresponding to the air outlet of the upper lid is arranged at the top end of the air inlet cavity.

In another aspect of the present invention, it provides a vacuum cleaner comprising a dust separating apparatus. The dust separating apparatus comprises a housing and a first cyclone separator integrated within the housing, wherein second cyclone separators are optional.

Advantageously, the second cyclone separators comprise several cyclonical units, and the dust collecting chambers thereof share a common annular cover at their bottom ends.

Preferably, the second cyclone separators are removable together as a whole.

Additionally, the second cyclone separators comprise a handle above the top cover for convenience.

In still another aspect of the present invention, a dust separating apparatus of a vacuum cleaner is provided. It comprises a housing, a first cyclone separator integrated within the housing and several removable second cyclone separators arranged around the first cyclone separator, wherein on the inner side of said housing, a supporting member is arranged, which extends to the center of the housing for supporting the second cyclone separators.

Furthermore, a filter member is arranged in the first cyclone separator, which comprises a hollow cylinder with a longitudinal axis and a pair of openings at both ends of said hollow cylinder. A perforated portion comprising several apertures is arranged on the hollow cylinder between the two openings, and the protrusion in the hollow cylinder overlaps partly with the perforated portion along the longitudinal axis. The opening at the top end of the hollow cylinder is connected through with the air outlet, while the opening at the bottom end is sealed.

Alternatively, the protrusion is conical, and the protrusion is integrally connected with the hollow cylinder in its middle portion.

Preferably, the protrusion is conical, and the protrusion is connected with the hollow cylinder in its middle portion, and is mounted onto the inner side of the hollow cylinder as a separate element.

Furthermore, the supporting member is of a plate.

Alternatively, the supporting member is of several projections.

The advantages of the present invention are as follows:

1. The present invention comprises a first cyclone separator integrated with the housing and several removable second cyclone separators arranged around the first cyclone separator, so that the air could be separated from the dust thoroughly to enable the expelled air cleaner without secondary pollution. Furthermore the first cyclone separator and the second cyclone separators could be cleaned separately for convenience.

2. The present invention comprises a first cyclone separator and several second cyclone separators, thereby increasing the airflow volume without the increase of the volume of the machine, and keeping a better performance.

3. The second cyclone separators of the present invention adopt an expanding configuration, i.e. the tapered barrel is of a small top end and a large bottom end. The cyclone inlet is located in the upper portion of the inlet barrel. The air flow decelerates in a centrifugal manner during revolving in the tapered barrel, thereby resulting in less pressure loss. Therefore, a better cleaning performance could be obtained.

4. The cyclonical chamber of the first cyclone separator of the present invention is isolated from a dust receiving cavity of the first cyclone separator by an inner cylinder body, thereby preventing dust at the bottom end of the barrel from being raised up under the cyclone, without causing secondary pollution.

5. The second cyclone separators of the present invention are set to be removable, and as an optional accessory of the vacuum cleaner. When the customers need vacuum cleaners of better performance, they simply need to add an accessory of the second cyclone separators to satisfy the requirement. The users can simply upgrade the vacuum cleaners of single cyclonical stage into two filtering stages by buying the accessory, which brings the users more convenience and increases their loyalty to the products.

BRIEF DESCRIPTION OF THE DRAWINGS

The present invention will be further described below in conjunction with the drawings and the embodiments, in which like reference numerals refer to similar elements and in which.

Figure 1:
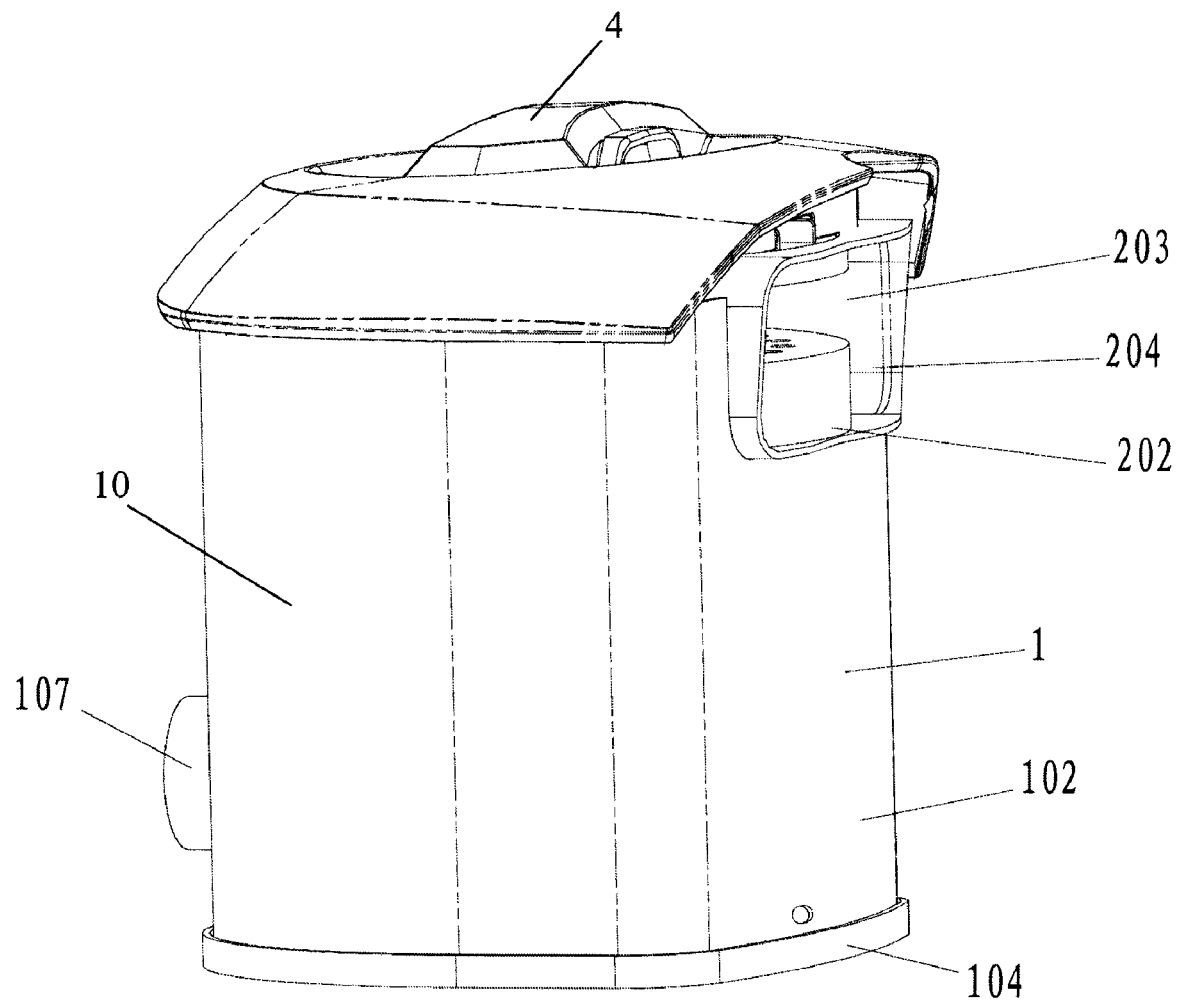
FIG. 1 is a perspective view of a vacuum cleaner comprising the dust separating apparatus in accordance with the present invention.

Wherein,

10 housing; 1 first cyclone separator; 101 dust receiving cavity; 102 outer cylinder body; 103 inner cylinder body; 104 bottom cover; 105 cyclonical chamber; 106 dust outlet; 107 airflow inlet pipe; 108 shelf; 109 middle cylinder body; 110 upper lid; 111 filter member; 112 opening; 113 air outlet; 114 cone-shaped protrusion; 115 projection;

2 second cyclone separator; 201 dust collecting chamber; 202 air inlet cavity; 203 air outlet cavity; 204 air discharging outlet; 205 inlet barrel; 206 tapered barrel; 207 cyclone inlet; 208 airflow outlet pipe; 209 annular cover; 210 umbrella-shaped reflecting plate; 211 ring gap; 212 reflowing hole; 213 inverted cone protrusion; 214 air discharging cavity; 1110 hollow cylinder; 1111 perforated portion; 1112 protrusion;

3 top cover; 4 handle; 5 guiding channel.

DETAILED DESCRIPTION OF THE PREFERRED EMBODIMENT

The first embodiment of the present invention is shown in FIGS. 1-6. A dust separating apparatus of a vacuum cleaner is provided in this invention. It comprises a first cyclone separator 1 which is integrated and located within a housing 10, and several second cyclone separators 2 which are removably arranged around the first cyclone separator 1. The first cyclone separator 1 and the second cyclone separators 2 have respectively a separate dust receiving cavity 101 and separate dust collecting chambers 201.

Figure 4:
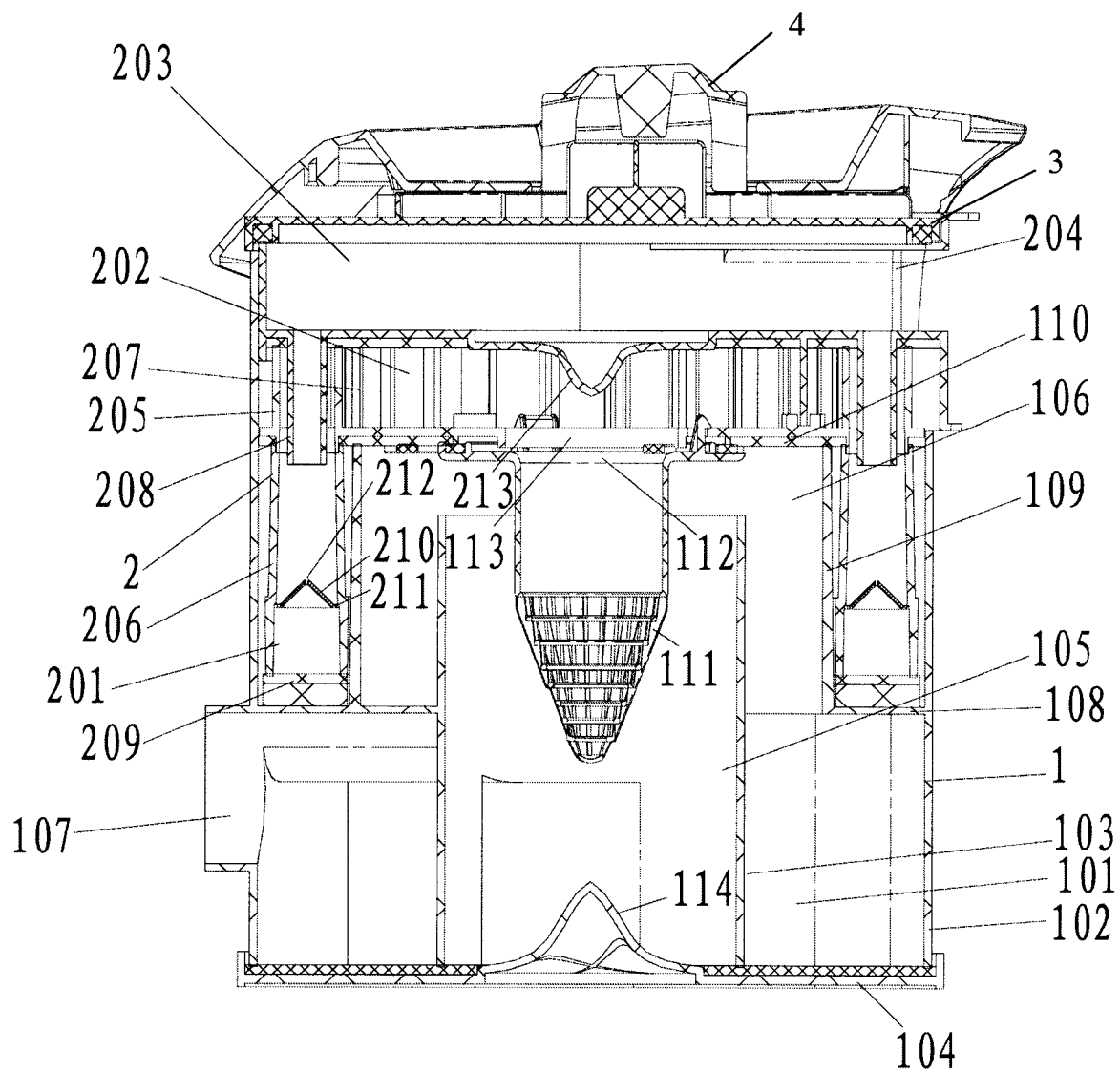
FIG. 4 is a front cross-sectional view of a vacuum cleaner comprising the dust separating apparatus in accordance with the present invention.
Figure 5:
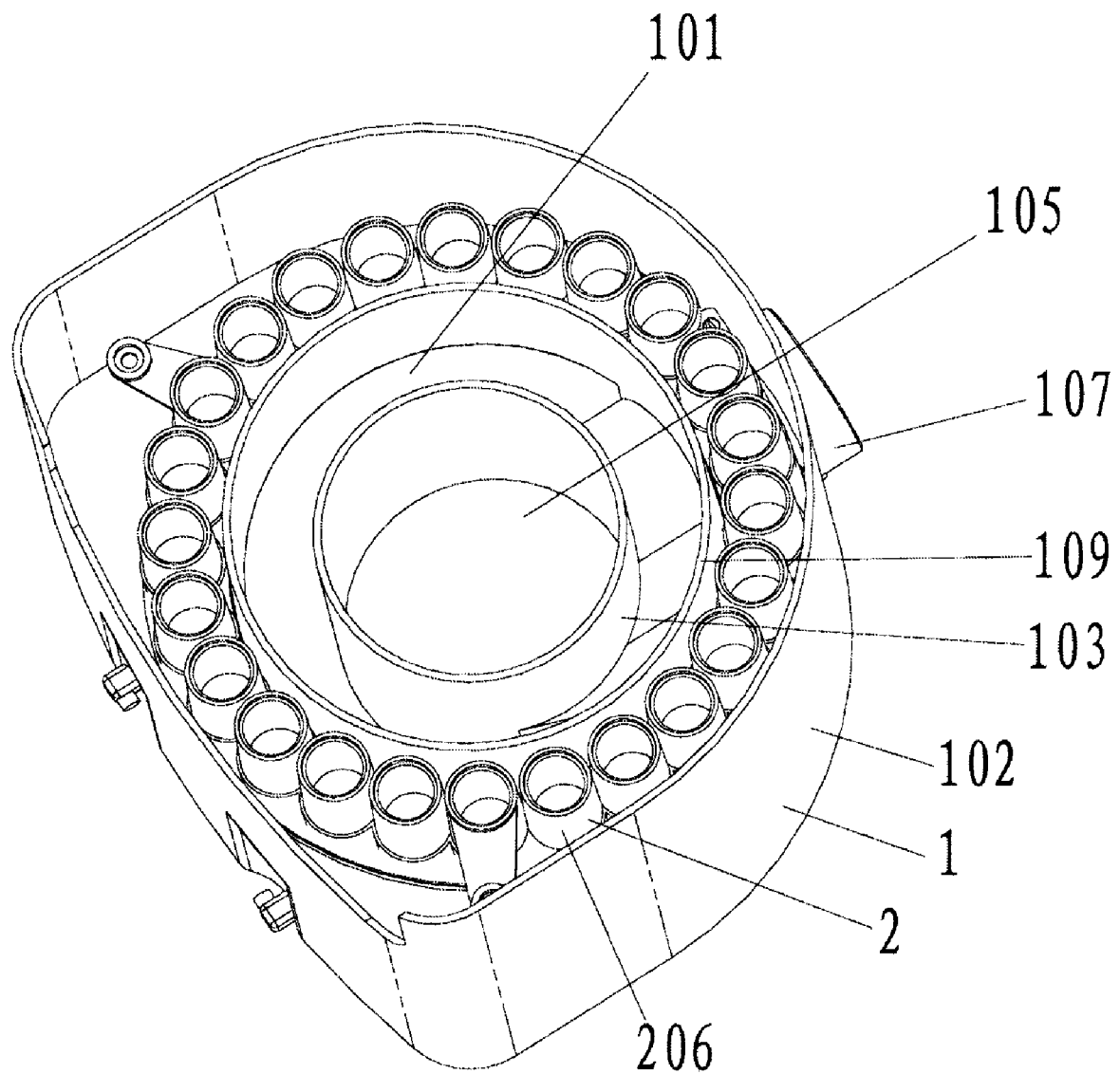
FIG. 5 is a schematic assembly view of the first and second cyclone separators of the dust separating apparatus in accordance with the present invention.

As best seen in FIG. 4, the housing 10 includes an outer cylinder body 102 and an inner cylinder body 103 which share a common bottom cover 104, and therebetween a dust receiving cavity 101 is defined. A cyclonical chamber 105 is arranged in the inner cylinder body 103, and a cone-shaped protrusion 114 on the bottom cover 104 is arranged at the bottom of the inner cylinder body 103. A dust outlet 106 is arranged in the upper portion of the inner cylinder body 103, and an airflow inlet pipe 107 enters into the inner cylinder body 103 through the outer cylinder body 102. An annular shelf 108 is arranged in the middle portion of the inner surface of the outer cylinder body 102 and a middle cylinder body 109 extends upwardly from the inner edge of the shelf 108. The second cyclone separator 2 is arranged between the middle cylinder body 109 and the outer cylinder body 102, and stands on the shelf 108. An upper lid 110 is arranged at the top end of the middle cylinder body 109. A filter member 111 fixed to the upper lid 110 is arranged in the upper portion of the inner cylinder body 103, an opening 112 at the top end of the filter member 111 being connected through to the second cyclone separator 2 via an air outlet 113 on the upper lid 110. An air inlet cavity 202 connected through to the air outlet 113 is arranged above the upper lid 110. Above the air inlet cavity 202, an air outlet cavity 203 is arranged, with an air discharging outlet 204 arranged thereon. An inverted cone protrusion 213 corresponding to the air outlet 113 of the upper lid 110 is arranged in the top portion of the air inlet cavity 202.

Figure 2:
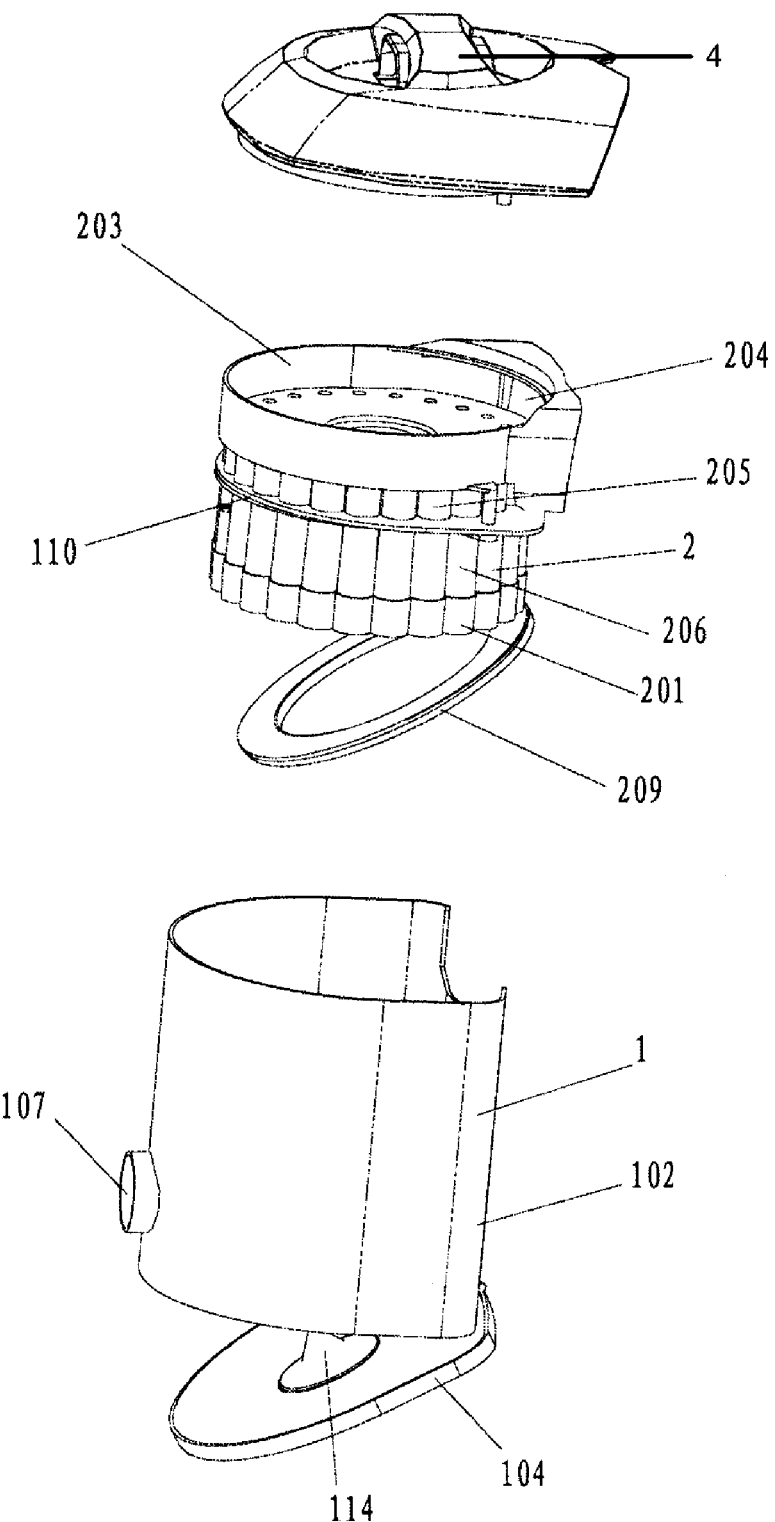
FIG. 2 is an explosive view of the vacuum cleaner of FIG. 1.
Figure 3:
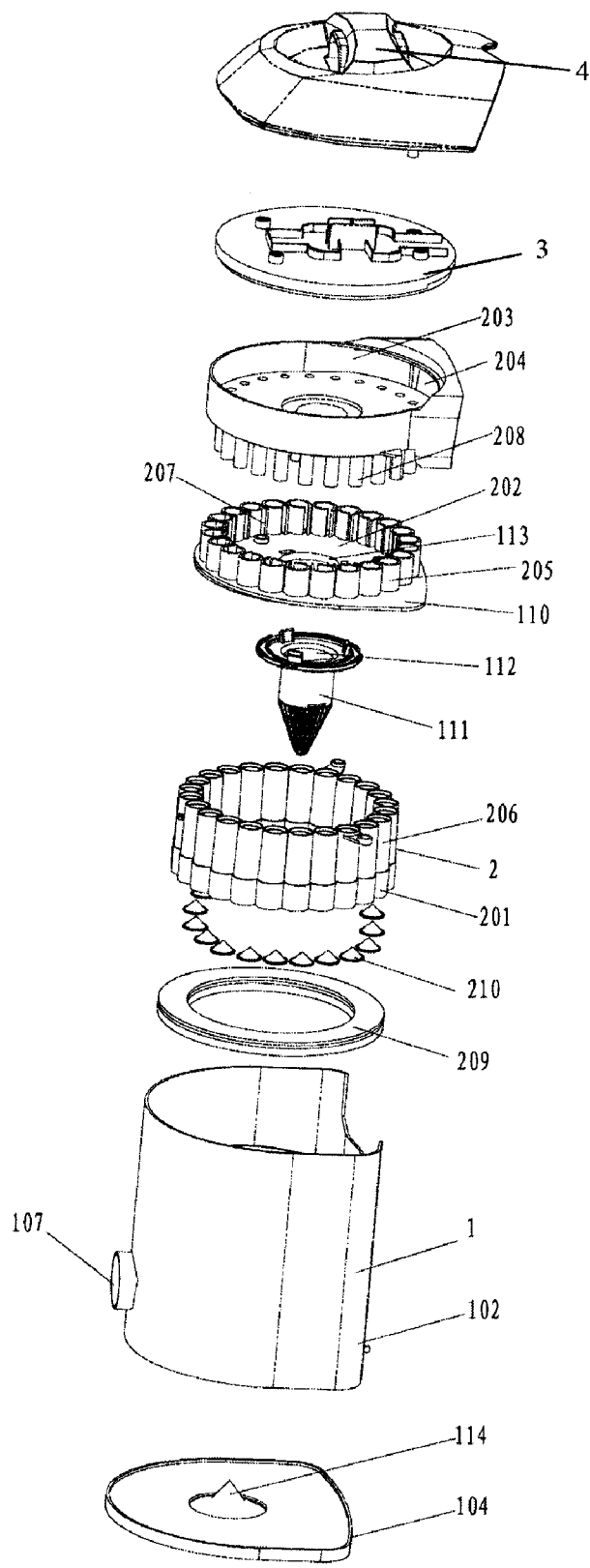
FIG. 3 is an assembly view of the vacuum cleaner of FIG. 1.

Referring to FIG. 2 combined with FIG. 3, each second cyclone separator 2 comprises an inlet barrel 205 in its upper portion, a tapered barrel 206 in its middle portion, and a dust collecting chamber 201 in its lower portion. The dust collecting chambers 201 of several second cyclone separators 2 share a common annular cover 209 at their bottom end. The inlet barrel 205 extends upwardly into the air inlet cavity 202, and downwardly into the tapered barrel 206. As best seen from FIG. 4, the tapered barrel 206 has a shape of a small top end and a large bottom end. The cyclone inlet 207 is located in the upper portion of the inlet barrel 205, so that the air flow decelerates in a centrifugal manner during revolving in the tapered barrel 206, thereby resulting in less pressure loss.

A cyclone inlet 207 located in the air inlet cavity 202 is arranged on the side wall of the inlet barrel 205. An airflow outlet pipe 208 whose top end is connected through to the air outlet cavity 203 through the air inlet cavity 202 is arranged in the inlet barrel 205. At the connection of the tapered barrel 206 and the dust collecting chamber 201 is an umbrella-shaped reflecting plate 210, which has a ring gap 211 for dust dropping defined along its peripheral and a reflowing hole 212 defined at its center.

In this embodiment, the configuration of the cone-shaped protrusion 114 on the bottom cover 104, the inverted cone protrusion 213 on the upper lid 110 and the umbrella-shaped reflecting plate 210 could all ensure the cyclonical performance advantageously.

During operation, the dust-laden air flows into the cyclonical chamber 105 of the first cyclone separator 1 through the airflow inlet pipe 107 thereby forming a cyclone. The coarse dust goes through the dust outlet 106 upwardly and enters the dust receiving cavity 101. The fine dust goes through the filter member 111, then enters the air inlet cavity 202 of the second cyclone separator 2 from the air outlet 113, and then enters each second cyclonic separator 2 from each corresponding cyclone inlet 207, thereby forming a cyclone in the tapered barrel 206 of the second cyclone separator 2. Fine dust enters the dust collecting chambers 201 downwardly along the inner wall of the tapered barrel 206 through the ring gap 211. The clean air enters the air outlet cavity 203 via the airflow outlet pipe 208, and then is discharged outwards through the air discharging outlet 204.

After use, the user could clean the first cyclone separator 1 and dispose the dust by opening the bottom cover 104, and could clean the second cyclone separators 2 and dispose the dust by removing the air outlet cavity 203, the air inlet cavity 202 and each second cyclone separator 2 upwardly out of the outer cylinder body 102 and opening the annular cover 209. Therefore, that's very convenient.

Furthermore, the embodiment also illustrates the whole structure of the vacuum cleaner of the present invention (as shown in FIGS. 1-4), wherein a handle 4 is arranged above a top cover 3 of the second cyclone separator 2 for convenience.

Figure 7:
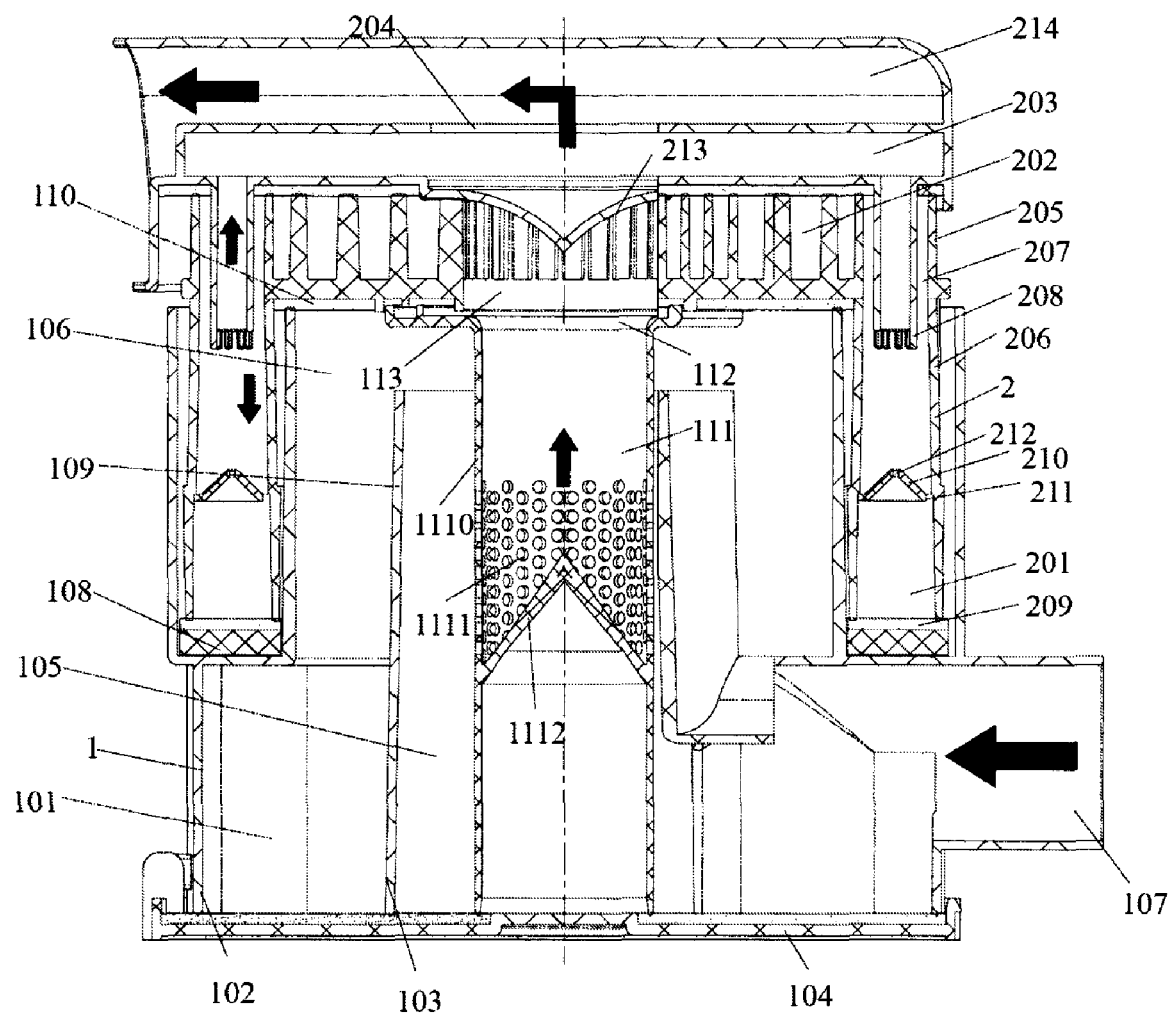
FIG. 7 is a front cross-sectional view of the dust separating apparatus in accordance with the second embodiment of the present invention.
Figure 8:
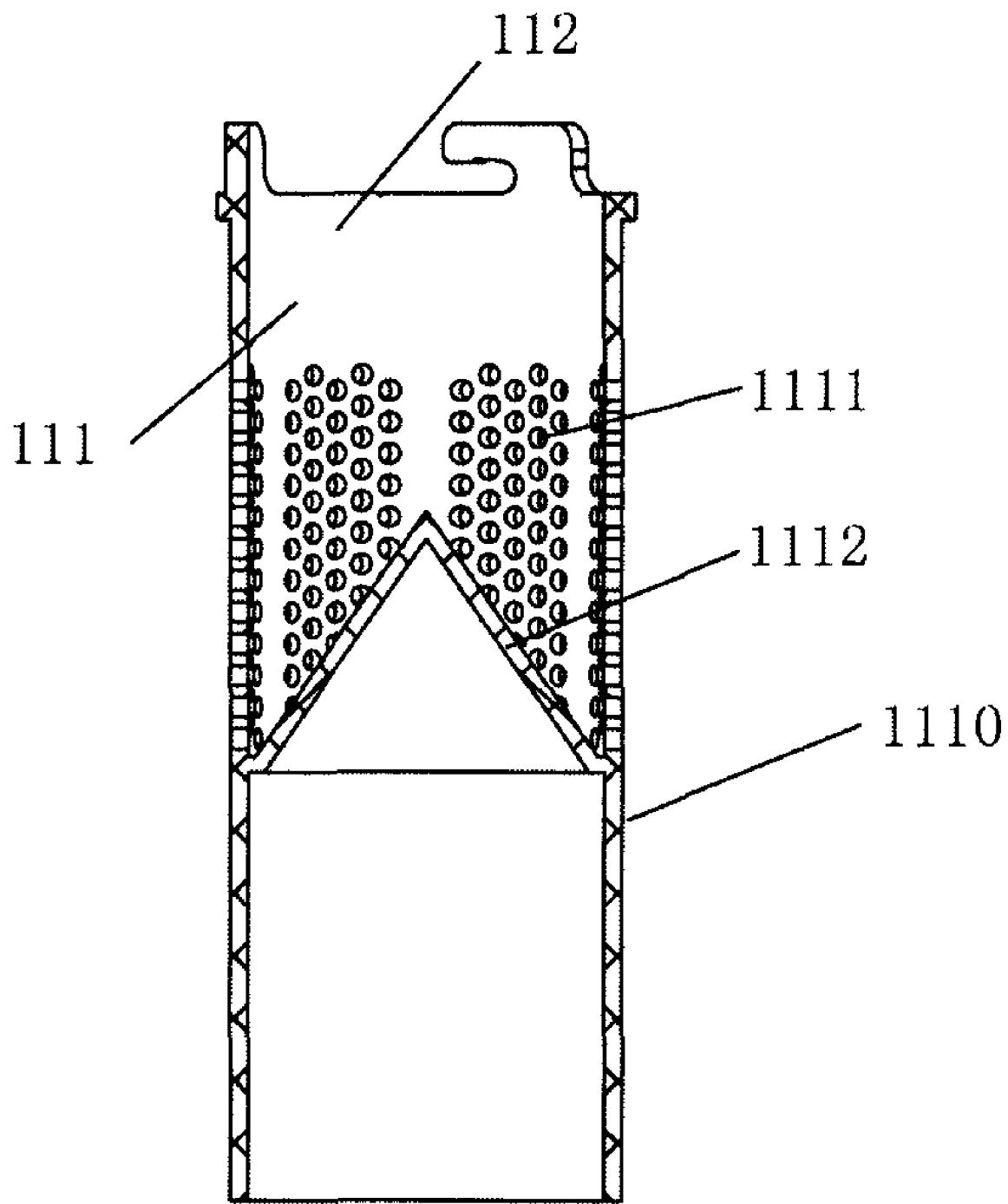
FIG. 8 is an enlarged schematic cross-sectional view of the filter member shown in FIG. 7.

FIGS. 7-8 show the second embodiment of the present invention. The dust separating apparatus of the second embodiment is substantially the same as that of the first embodiment in main structure and principle. Therefore, only the differences between the two embodiments will be described below.

As seen from FIG. 7, the cone-shaped protrusion 114 arranged on the bottom cover 104 in the first embodiment is not adopted here. Instead as best seen in FIG. 8, the filter member 111 is improved in configuration. That is, the filter member 111 is configured as a hollow cylinder 1110 with a longitudinal axis, which includes a pair of openings at both ends. A perforated portion 1111 comprising several apertures is arranged on the hollow cylinder 1110 between the two openings. The filter member 111 further includes a protrusion 1112 arranged in the hollow cylinder 1110, which at least partly overlap with the perforated portion 1111 along the longitudinal axis. The opening 112 at the top end of the hollow cylinder 1110 is connected through with the air outlet 113 arranged at the upper lid 110, while the opening at the bottom end is sealed.

Advantageously, the protrusion 1112 is conical and connected with the hollow cylinder 1110 at its middle portion, for replacing the cone-shaped protrusion 114 of the first embodiment in function. Furthermore, the protrusion 1112 could be integrated within the hollow cylinder 1110, or fitted on the inner side of the hollow cylinder as a separated element.

The difference between the two embodiments also exists in the design of the air discharging outlet 204. The air discharging outlet 204 in this embodiment is arranged directly above the inverted cone protrusion 213 and connected through with the air discharging cavity 214 to deliver the airflow which has been filtered twice into the motor. Similarly, the arrow in FIG. 7 also indicates the track of the airflow in the vacuum cleaner which is the same as that in the first embodiment.

Referring back to FIG. 5 again, it shows the fitting relationship between the first cyclone separator 1 and the second cyclone separators 2 in the first embodiment. Wherein, several second cyclone separators 2 are arranged around the first cyclone separator 1, so that the space between the outer cylinder body 102 and the inner cylinder body 103 is made best use of, while the cyclonical chamber 105 of the first cyclone separator is isolated from the dust receiving cavity 101 of the first cyclone separator by the inner cylinder body 103, thereby avoiding secondary pollution.

Figure 9:
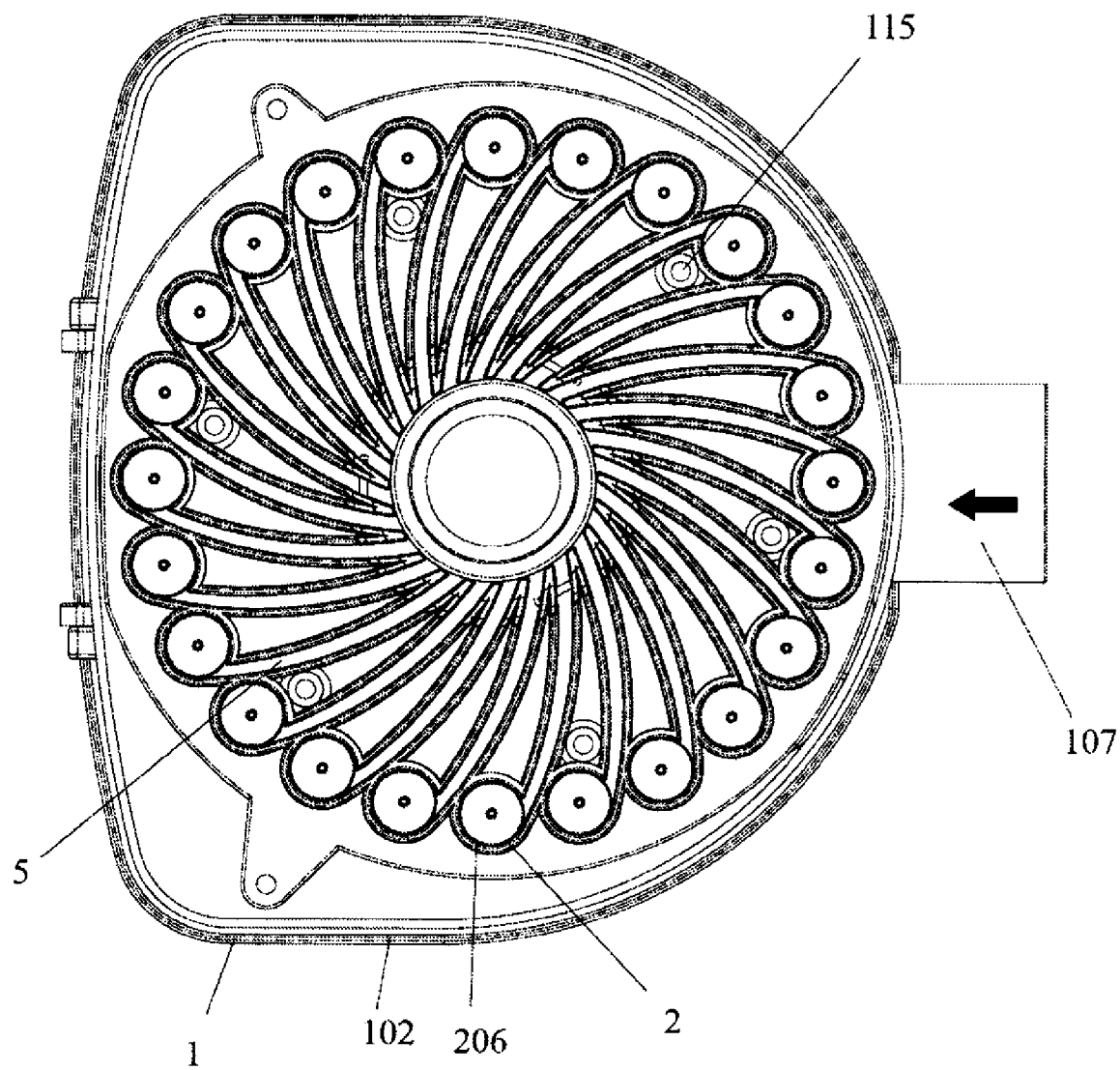
FIG. 9 is a schematic assembly view of the first and second cyclone separators of the dust separating apparatus in accordance with the present invention similar to FIG. 5, illustrating the third embodiment of the dust separating apparatus of the present invention.

FIG. 9 illustrates the third embodiment of the dust separating apparatus in accordance with the invention, i.e. the second kind of fitting relationship between the first cyclone separator 1 and the second cyclone separator 2. In this embodiment, the air laden with dust enters the first cyclone separator 1 via the airflow inlet pipe 107, and is driven to rotate in clockwise direction by the generated cyclone. The air after the first filtering enters the tapered barrel 206 of the second cyclone separator for the second filtering under the guide of the guiding channel 5. Such arrangement can further guide the clean air to avoid secondary pollution. It should be understood, the "clockwise" mentioned here only points to the arrangement adopted in the embodiment as shown, and it is not restrictive.

Figure 6:
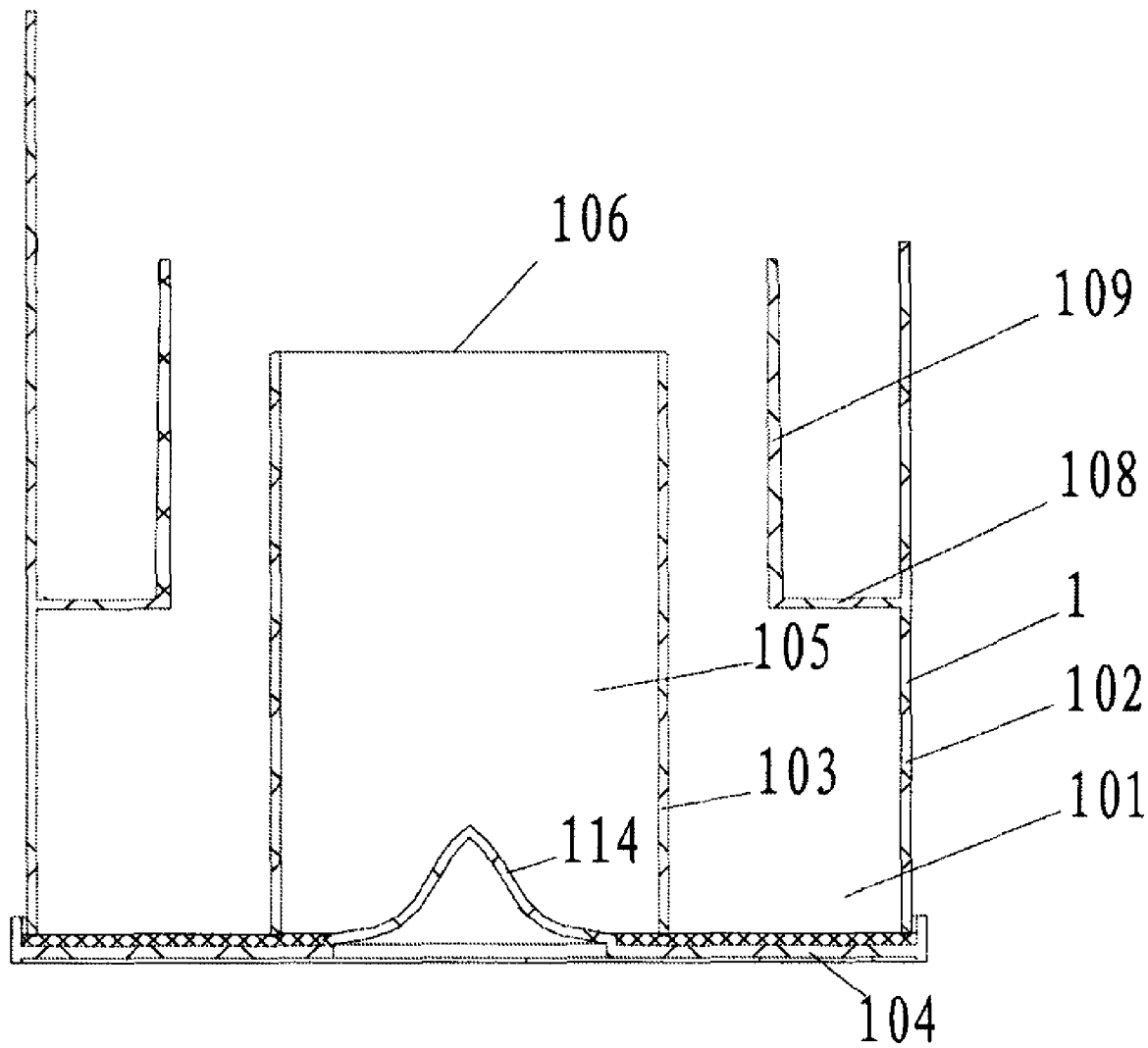
FIG. 6 is a schematic view of the outer cylinder body, middle cylinder body, and inner cylinder body of the dust separating apparatus in accordance with the present invention.

Furthermore, the supporting member for supporting the second cyclone separator 2 in this invention is arranged to extend from the inner side of housing to its center. In the first embodiment of this invention as shown in FIG. 6, the supporting member is a shelf 108 of plate shape. In the embodiment as shown in FIG. 9, the support member could be designed as several projections 115 which extend inwards from the inner side of housing.

The preferred embodiment of the present invention has been set forth in the foregoing descriptions and accompanying drawings. It could be envisaged that various modifications and variations will occur to a skilled person in the art without departing from the scope and spirit of the appended claims.

The invention claimed is:

1. A dust separating apparatus of a vacuum cleaner, comprising: a housing, a first cyclone separator integrated within the housing, and several second cyclone separators arranged around the first cyclone separator, wherein the second cyclone separators are removably mounted into the housing, and the first cyclone separator and the second cyclone separators respectively have a separate dust receiving cavity and separate dust collecting chambers; wherein said housing comprises an outer cylinder body and an inner cylinder body, which share a common bottom cover and between which a dust receiving cavity is defined, in the inner cylinder body, a cyclonical chamber being arranged and in the upper portion of the inner cylinder body, a dust outlet being arranged, an airflow inlet pipe entering the inner cylinder body through the outer cylinder body, in the middle portion of the inner side of the outer cylinder body, a shelf being arranged, from whose inner edge a middle cylinder body extending upwardly, said second cyclone separator being arranged between the middle cylinder body and the outer cylinder body and standing on said shelf, an upper lid being arranged at the top end of the middle cylinder body and a filter member fixed on the at the top end of the filter member connected through to the second cyclone separators via an air outlet on the upper lid.

2. A dust separating apparatus of a vacuum cleaner according to claim 1, wherein said second cyclone separators comprise several cyclonic units, the dust collecting chambers thereof sharing a common annular cover at their bottom ends.

3. A dust separating apparatus of a vacuum cleaner according to claim 1, wherein a cone-shaped protrusion on the bottom cover is arranged at the bottom of said inner cylinder body.

4. A dust separating apparatus of a vacuum cleaner according to claim 1, wherein an air inlet cavity connected through with said air outlet is arranged above said upper lid, an air outlet cavity with an air discharging outlet thereon being arranged above the air inlet cavity, each second cyclone separator including an inlet barrel in its upper portion, a tapered barrel in its middle portion and a dust collecting chamber in its lower portion, said inlet barrel extending upwardly into the air inlet cavity a cyclone inlet in the air inlet cavity being defined on the side wall of the inlet barrel and an airflow outlet pipe being arranged in the inlet barrel, and the top end of airflow outlet pipe being connected through with the air outlet cavity via the air inlet cavity.

5. A dust separating apparatus of a vacuum cleaner according to claim 4, wherein at the connection of the tapered barrel and the dust collecting chamber, an umbrella-shaped reflecting plate is arranged, which has a ring gap for dust dropping defined along its peripheral and a reflowing hole defined at its center.

6. A dust separating apparatus of a vacuum cleaner according to claim 4, wherein an inverted cone protrusion corresponding to the air outlet of the upper lid is arranged at the top end of said air inlet cavity.

7. A dust separating apparatus of a vacuum cleaner, comprising: a housing, a first cyclone separator integrated within the housing and several removable second cyclone separators arranged around said first cyclone separator, wherein on the inner side of said housing, a supporting member is arranged, which extends to the center of the housing for supporting said second cyclone separator; wherein a filter member is arranged in the first cyclone separator, which comprises a hollow cylinder with a longitudinal axis, and a pair of openings at both ends of said hollow cylinder, and a perforated portion comprising several apertures is arranged on the hollow cylinder between the two openings, a protrusion in the hollow cylinder overlaps partly with the perforated portion along the longitudinal axis, said opening at the top end of the hollow cylinder being connected through with said air outlet, while said opening at the bottom end being sealed.

8. A dust separating apparatus of a vacuum cleaner according to claim 7, wherein said protrusion is conical, said protrusion being integrally connected with the hollow cylinder in its middle portion.

9. A dust separating apparatus of a vacuum cleaner according to claim 7, wherein said protrusion is conical, said protrusion being connected with the hollow cylinder in its middle portion, and being mounted onto the inner side of the hollow cylinder as a separate element.

10. A dust separating apparatus of a vacuum cleaner according to claim 7, wherein said supporting member is of a plate.

11. A dust separating apparatus of a vacuum cleaner according to claim 7, wherein said supporting member is of several projections.

* * * * *